UNITED STATES PATENT OFFICE.

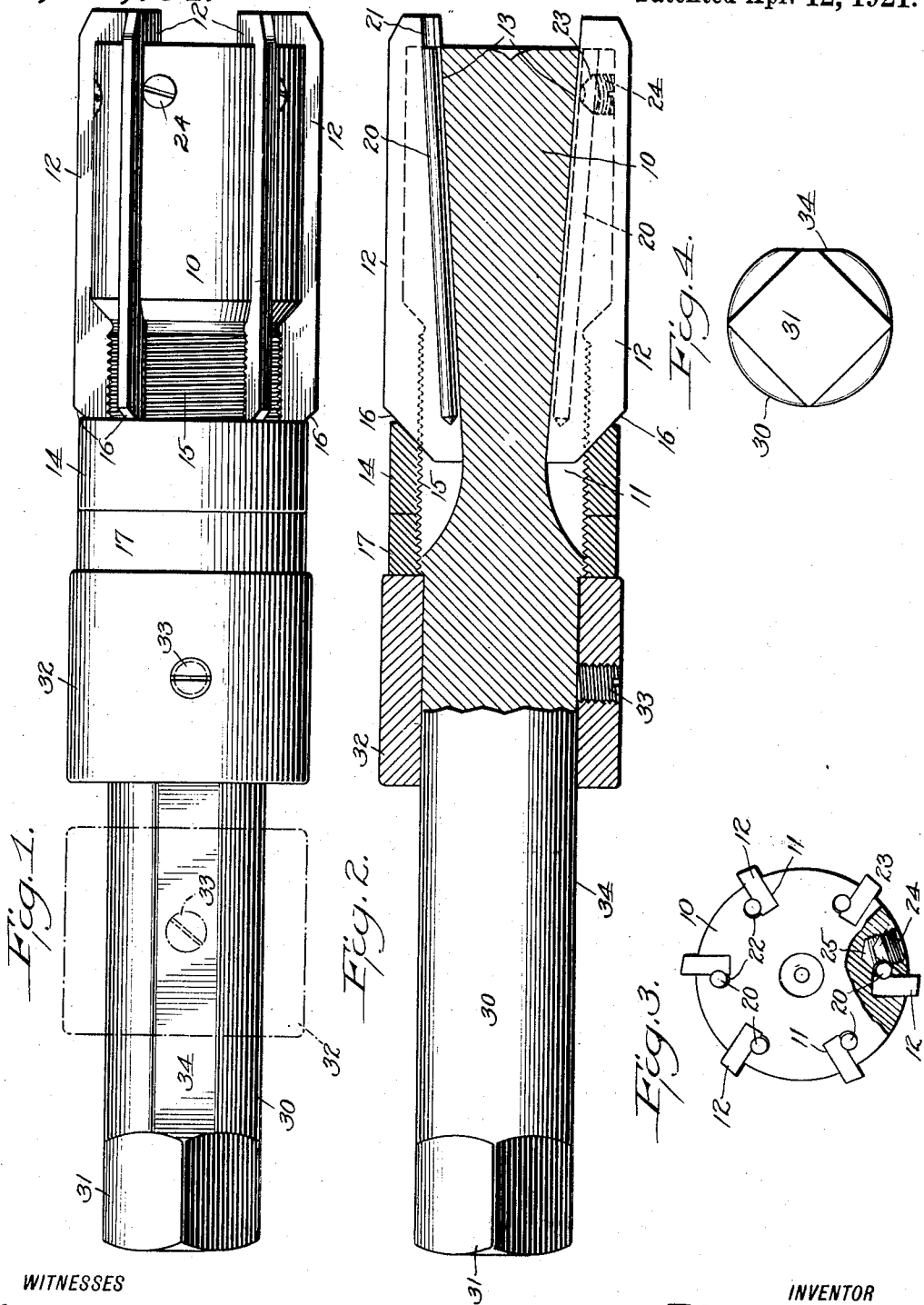

FRANK P. MILLER, OF MEADVILLE, PENNSYLVANIA.

ADJUSTABLE HAND-REAMER.

1,374,754.  Specification of Letters Patent.  Patented Apr. 12, 1921.

Application filed December 10, 1918. Serial No. 266,112.

*To all whom it may concern:*

Be it known that I, FRANK P. MILLER, a citizen of the United States, and a resident of Meadville, in the county of Crawford and State of Pennsylvania, have invented a new and Improved Adjustable Hand-Reamer, of which the following is a full, clear, and exact description.

The invention relates to reamers such as shown and described in the Letters Patent of the United States, No. 1,244,227, granted to me on October 23, 1917.

The object of the present invention is to provide a new and improved adjustable hand reamer arranged to insure a proper accurate guiding of the reamer when reaming long bores with a view to produce a bore true throughout its length. Another object is to securely hold the cutters in place on the head of the reamer.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a plan view of the adjustable hand reamer;

Fig. 2 is a longitudinal central section of the same with part of the shank shown in elevation;

Fig. 3 is a front end elevation of the adjustable hand reamer with part of the head shown in section; and Fig. 4 is a rear end view of the shank.

The head 10 of the hand reamer is provided with lengthwise extending slots 11 in which are adjustably secured the cutters 12 used for reaming a bore. The cutters 12 are seated on the inclined bottoms 13 of the slots 11 and the cutters are adjusted lengthwise for reaming a bore to the desired diameter by the use of an adjusting nut 14 screwing on the threaded portion 15 of the head and against the inclined rear edges 16 of the cutters 12, as plainly shown in the drawings. The adjusting nut 14 is locked in place after the desired adjustment is made by a locking nut or ring 17 screwing on the threaded portion 15 of the head 10.

The cutters 12 are fastened in position in the head 10 by the use of pins 20 engaging grooves 21 formed lengthwise in the cutters 12, the fillets also extending into elongated recesses 22 formed in the head 10 at the corresponding side walls of the grooves 11 (see Fig. 3). Each of the pins 20 is engaged by the inner conical end 23 of a set screw 24 screwing in a threaded recess 25 in the head 10, the set screw 24 being headless and being flush with the peripheral face of the head 10 so as to form no undesirable projections on the said head.

The head 10 is provided with a rearwardly extending shank 30 cylindrical in cross section and terminating in a polygonal end 31 for the application of a key, wrench or other suitable tool for turning the reamer in the bore to be reamed. On the shank 30 is slidably fitted a guide sleeve 32 of an external diameter approximately corresponding to the bore to be reamed so that the guide sleeve 32 fits into the bore and thus steadies the reamer to insure accurate cutting of the cutters 12 with a view to produce a true bore. The guide sleeve 32 is held adjustable on the shank 30 at any point between the locking ring 17 and the polygonal end 31, and the guide sleeve 32 is fastened in the adjusted position by a headless set screw 33 screwing in the sleeve and bearing against a flattened portion 34 extending lengthwise of the shank from the head 10 to the end 31. It is understood that the set screw 33 does not project onto the peripheral face of the guide sleeve 32 and hence forms no undesirable projection, but on loosening the set screw 33 the guide sleeve 32 may be readily shifted on the shank 30 to a desired position and then fastened in place on the shank by screwing up the set screw 33.

It is understood that for reaming long holes it is very desirable to have a guide sleeve for steadying the reamer to insure true reaming of the bore. For short bores the guide sleeve 32 can be removed from the shank 30 as it is not absolutely needed on reaming short bores. The guide sleeve can also be removed from the shank when it is necessary to replace the locking ring 17 or the adjusting nut 14 by a new one.

Having thus described my invention, I claim as new and desire to secure by Letters Patent:—

A reamer comprising a cutting head member provided with a relatively long cylindrical shank, the cutting edges of the head member being concentric with said shank, a relatively short guide and bearing sleeve movably mounted on said shank, the periphery of said sleeve also concentric with said cylindrical shank, and means whereby said sleeve may be held rigidly or loosely on the shank at any point between its free end and the said cutting head.

FRANK P. MILLER.